Aug. 10, 1965

R. CUNY 3,199,877

SHAFT SEAL FOR GAS-FILLED ELECTRIC MACHINES
UTILIZING SEALING LIQUID INTRODUCED INTO
SEALING RING LOCATED IN ANNULAR CHAMBER
SURROUNDING SHAFT
Filed Jan. 12, 1962

INVENTOR.
Robert Cuny
BY
Pierre Scheffler & Parker
Attorneys

United States Patent Office 3,199,877
Patented Aug. 10, 1965

3,199,877
SHAFT SEAL FOR GAS-FILLED ELECTRIC MACHINES UTILIZING SEALING LIQUID INTRODUCED INTO SEALING RING LOCATED IN ANNULAR CHAMBER SURROUNDING SHAFT
Robert Cuny, Wettingen, Switzerland, assignor to Aktiengesellschaft Brown, Boveri & Cie., Baden, Switzerland, a joint-stock company
Filed Jan. 12, 1962, Ser. No. 165,918
Claims priority, application Switzerland, Jan. 24, 1961, 842/61
9 Claims. (Cl. 277—29)

This invention relates to a shaft seal for gas-filled electric machines, particularly hydrogen-cooled turbogenerators, with sealing rings arranged movably in a stationary housing and surrounding the machine shaft with a small clearance. By means of the housing and the ring an annular chamber is formed for the sealing liquid, the inner diameter of which coincides with the outer diameter of the ring, whereby the sealing liquid which has a higher pressure than the gas pressure inside the machine passes from the annular chamber in a radial direction into the sealing ring and then along the annular clearance gap between the shaft and the ring.

Due to the very small clearance between the sealing ring and the shaft, the sealing ring also oscillates when the shaft vibrates radially. Since, however, in the hitherto known types of shaft seals the annular chamber is always filled with sealing liquid, generally oil, the latter due to its incompressibility is always forced out at the point where the oscillation occurs so that the sealing ring is subjected to an additional stress. If for instance the vibrational deflection is in the upward direction, the oil is forced downwards on both sides inside the annular chamber. This disturbing effect of the incompressibility of the sealing liquid which occurs during unsteady rotation of the shaft, can under certain conditions result in increasing vibrations, whereby the wear and losses due to friction are increased still further.

The object of the present invention is to prevent the aforementioned effects of the incompressibility of the sealing liquid in the known types of shaft seal. In accordance with the invention this is achieved by maintaining at least a space limited by the sealing housing and the sealing ring at least partly free of sealing liquid.

Figure 1:
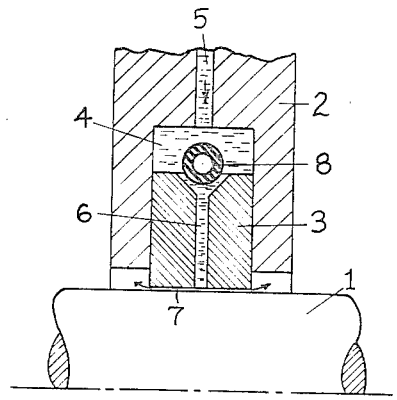
Figure 2:
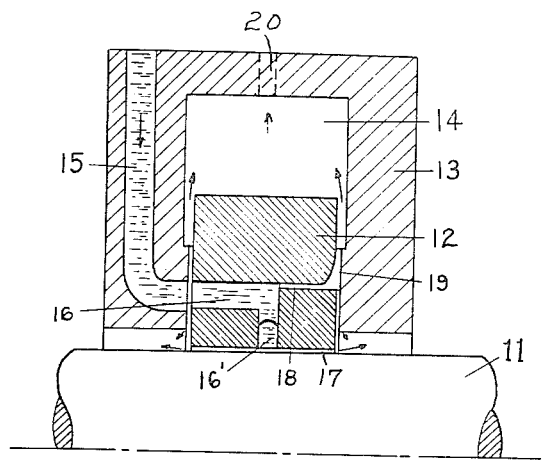

The invention is now explained by means of the drawings, where FIGS. 1 and 2 show two different constructional examples in longitudinal section, all parts not essential for an understanding of the invention having been omitted from the drawing.

In FIG. 1 reference numeral 1 indicates the shaft of a machine, for example a turbo-generator, whose casing is filled with hydrogen. Rigidly connected to each end of the machine casing not shown in the drawing is a seal housing 2 inside of which a sealing ring 3 is located that is movable in a radial direction. This sealing ring which can consist of one or more parts, surrounds shaft 1 with a very small clearance and is so dimensioned that an annular chamber 4 is formed between the housing 2 and ring 3. This chamber 4 is supplied through radial bores 5 with sealing liquid (e.g. oil) and this oil then passes through channels 6 in the sealing ring to the annular gap 7 between the sealing ring and the shaft. Part of the sealing liquid flows along this gap to the air side of the seal and the other part to the gas side of the seal, because the sealing liquid is at a pressure greater than that of the gas in the machine casing.

Inside the annular chamber 4 a flexible tube 8 is arranged around the sealing ring 3 which is closed or can be filled with gas from outside by way of a pipe. In the latter case the tube can be connected to the hydrogen filling in the generator. The hollow tube 8 is located close to the channels 6 leading to the annular gap 7.

Due to the rubber tube 8 in the pressure chamber 4, the undesirable coupling which is produced between the sealing ring and the stationary sealing element, that is between shaft 1 and housing 2, due to the presence of the incompressible sealing liquid (oil) is eliminated. This is due to the fact that tube 8 being hollow and made of rubber which is an elastic material, can be locally compressed to reduce its volume within the chamber and in this manner, the pumping effect produced by vibrations of ring 3 is, to a great extent, eliminated. For example, when ring 3 moves upward, at a certain instant during the vibration, then the volume of chamber 4 becomes smaller at this point. The sealing liquid, oil, which is incompressible, must be displaced at this point and, without the presence of tube 8, it would be pumped around the ring in the downward direction. However, as a result of the hollow tube 8 being there, the tube will be compressed at the point where the oil displacement occurs, and the oil filled part of chamber 4 is correspondingly locally enlarged. Thus, the aforementioned pumping effect around the ring is greatly reduced. There remains a very slight pumping effect due to the tube being compressed, but this is negligible when compared to the much greater pumping effect which would take place except for the presence of the tube.

It is conceivable that the hollow tube, if closed altogether, might after an extended period of service become less able to perform its function due to deterioration of the tube wall permitting oil to penetrate to the interior of the tube and thus render it practically incompressible. In order to prevent the tube from being completely filled with oil in the course of time, it is expedient, as previously explained, to connect the hollow space inside the tube to the atmosphere outside of the generator machine, or to the gas filling within the generator machine.

The same effect can also be achieved in a somewhat different way, this being explained by means of the constructional example shown in FIG. 2. In this case 11 indicates the shaft of the machine, 12 the sealing ring, 13 the seal housing and 14 the annular chamber formed by the housing and the sealing ring. The sealing liquid which is at an over-pressure is supplied to the sealing ring 12 and the annular gap 17 by way of the channels 15 and 16, 16' provided in the seal housing 13 and in the ring 12 respectively.

With this constructional form the annular chamber 14 is either in communication with the atmosphere, under vacuum, or filled with gas, so that the incompressibility of the sealing liquid can no longer have a detrimental effect in the seal The sealing liquid which escapes between the side walls of the seal housing 13 and the sealing ring 12 into the chamber 14, can pass out through an outlet opening 20. If seals are provided between the side walls, annular chamber 14 can be kept entirely free from sealing liquid.

In connection with shaft seals for gas-filled machines it is known that the sealing rings cannot "float," due to unbalanced axial forces, that is, frictional losses occur between the sealing ring and the seal housing and these are all the greater the higher the gas pressure in the machine. In order to avoid also these frictional losses, the arrangement according to FIG. 2 is provided with an additional device which enables the axial forces to be equalized, so that all frictional losses occurring either due to vibration or unbalanced axial forces can be avoided.

As can be seen in FIG. 2, part of the sealing liquid is used to obtain axial pressure equalisation. This partial stream of liquid flows from the bore 16 through a further small bore 18 which acts as a flow resistance, to the radial gap 19 which acts like a valve between the wall of the seal housing 13 on the gas side and the sealing ring 12. The opening of this valve adjusts itself automatically to suit the axial forces acting on the sealing ring, so that these are always balanced and the ring remains in suspension in the axial direction.

The invention is of course not restricted to shaft seals with floating or suspended sealing rings. It can also be applied to seals for shaft collars (radial shaft gap with sealing rings acting in an axial direction on the shaft collar), whereby in such a case the additional device for obtaining an axial pressure equalisation is superfluous.

I claim:

1. In a shaft seal for gas-filled electric machines, particularly gas-cooled turbo-generators, the combination comprising a housing wall structure through which the shaft of said machine extends, said wall structure providing an annular chamber surrounding said shaft and opening onto the surface of the shaft, a sealing ring located within and partly filling said annular chamber and surrounding said shaft with a small clearance gap, means supplying a sealing liquid to said annular chamber and which flows through channels in said sealing ring to reach said clearance gap, the pressure of the sealing liquid being higher than that of the gas within said machine, the remainder of said annular chamber not occupied by said sealing ring being provided with means for at least partly reducing the amount of said sealing liquid therein to compensate the pumping effect on said housing otherwise ensuing from vibrations transmitted to said ring from said shaft.

2. In a shaft seal for gas-filled electric machines, particularly gas-cooled turbo-generators, the combination comprising a housing wall structure through which the shaft of said machine extends, said wall structure providing an annular chamber surrounding said shaft and opening onto the surface of the shaft, a sealing ring located within and partly filling said annular chamber and surrounding said shaft with a small clearance gap, means supplying a sealing liquid to fill said annular chamber and which flows through channels in said sealing ring to reach said clearance gap, the pressure of the sealing liquid being higher than that of the gas within said machine, and a compressible element located within said annular chamber in the part thereof not occupied by said sealing ring, said element being compressed by the surrounding liquid upon vibration of said shaft to compensate the pumping effect on said housing otherwise ensuing from vibrations transmitted to said ring from said shaft.

3. A shaft seal structure as defined in claim 2 wherein said compressible element is constituted by an elastic tube in the form of a ring surrounding said sealing ring.

4. A shaft seal structure as defined in claim 3 wherein the interior of said elastic tube includes a gas filling.

5. A shaft seal structure as defined in claim 3 wherein the interior of said tube is filled with the same gas as that used for cooling said machine.

6. A shaft seal structure as defined in claim 3 wherein said elastic tube is positioned in said annular chamber adjacent radial liquid channels in said sealing ring.

7. In a shaft seal for gas-filled electric machines, particularly gas-cooled turbo-generators, the combination comprising a housing wall structure through which the shaft of said machine extends, said wall structure providing an annular chamber surrounding said shaft and opening onto the surface of the shaft, a sealing ring located within and partly filling said annular chamber and surrounding said shaft with a small clearance gap, channels in said housing structure and in said sealing ring for supplying sealing liquid to said clearance gap, the pressure of the sealing liquid being higher than that of the gas within said machine, the remainder of said annular chamber not occupied by said sealing ring being placed in communication with the atmosphere to compensate the pumping effect on said housing otherwise ensuing from vibrations transmitted to said ring from said shaft.

8. In a shaft seal for gas-filled electric machines, particularly gas-cooled turbo-generators, the combination comprising a housing wall structure through which the shaft of said machine extends, said wall structure providing an annular chamber surrounding said shaft and opening onto the surface of the shaft, a sealing ring located within and partly filling said annular chamber and surrounding said shaft with a small clearance gap, channels in said housing structure and in said sealing ring for supplying sealing liquid to said clearance gap, the pressure of the sealing liquid being higher than that of the gas within said machine, the remainder of said annular chamber not occupied by said sealing ring being filled with a gas to compensate the pumping effect on said housing otherwise ensuing from vibrations transmitted to said ring from said shaft.

9. In a shaft seal for gas-filled electric machines, particularly gas-cooled turbo-generators, the combination comprising a housing wall structure through which the shaft of said machine extends, said wall structure providing an annular chamber surrounding said shaft and opening onto the surface of the shaft, a sealing ring located within and partly filling said annular chamber and surrounding said shaft with a small clearance gap, channels in said housing structure and in said sealing ring for supplying sealing liquid to said clearance gap, the pressure of the sealing liquid being higher that that of the gas within said machine, the remainder of said annular chamber not occupied by said sealing ring being provided with an outlet opening for maintaining it at least partly free of said sealing liquid to compensate the pumping effect on said housing otherwise ensuing from vibrations transmitted to said ring from said shaft and means including a constricted liquid flow channel in said sealing ring terminating in a valve established by a radial gap between said housing and sealing ring, the liquid flow through said constricted channel and valve serving to maintain said sealing ring in suspension in the axial direction of said shaft.

References Cited by the Examiner

UNITED STATES PATENTS 3,047,299  7/62  Karsten _____ 277—27

LEWIS J. LENNY, *Primary Examiner.*

WALTER A. SCHEEL, EDWARD V. BENHAM,
*Examiners.*